United States Patent [19]

Conn et al.

[11] Patent Number: 4,504,806

[45] Date of Patent: Mar. 12, 1985

[54] MODULAR BEAM WAVEGUIDE

[75] Inventors: James K. Conn, Indialantic; Sharadchandra D. Patel, Melbourne, both of Fla.

[73] Assignee: Harris Corporation, Melbourne, Fla.

[21] Appl. No.: 399,743

[22] Filed: Jul. 19, 1982

[51] Int. Cl.[3] .......................... H01P 3/14; H01P 1/00; H01P 1/02; F16L 11/00

[52] U.S. Cl. .................................... 333/241; 333/248; 333/249; 138/120; 350/619

[58] Field of Search ....................... 350/299, 301, 294; 333/239, 241, 261, 248, 249; 138/120; 343/908, 343/912, 914, 893, 878

[56] References Cited

U.S. PATENT DOCUMENTS

| | | | |
|---|---|---|---|
| 885,087 | 4/1908 | Samaha | 350/301 |
| 948,216 | 8/1909 | Fluke | 350/301 |
| 1,300,901 | 4/1919 | Warner | 350/301 |
| 1,352,841 | 9/1920 | Silver | 350/301 |
| 2,424,064 | 7/1947 | Stegeman | 350/299 X |
| 2,493,842 | 1/1950 | Tyrell | 343/850 X |
| 2,612,559 | 9/1952 | Jouget | 333/239 |
| 2,956,248 | 10/1960 | Strand | 333/241 |
| 3,087,130 | 4/1963 | Marcatili | 333/249 |
| 4,047,133 | 9/1977 | Merle | 333/241 |

FOREIGN PATENT DOCUMENTS

| | | | |
|---|---|---|---|
| 1190284 | 10/1959 | France | 333/249 |
| 75857 | 7/1961 | France | 350/294 |
| 52-27242 | 3/1977 | Japan | 333/249 |
| 52-27243 | 3/1977 | Japan | 333/249 |
| 16483 | 11/1915 | United Kingdom | 350/301 |

*Primary Examiner*—John K. Corbin
*Assistant Examiner*—Richard F. Gallivan
*Attorney, Agent, or Firm*—Antonelli, Terry & Wands

[57] ABSTRACT

Modular-configured beam waveguide for transmitting microwave energy is formed of a plurality of cascaded modules each module containing a pair of reflecting surfaces, e.g. mirrors with the mirrors prealigned with one another and mounted in a supporting conduit or tube. Each tube or conduit module has a pair of orthogonal axes about which its joints with adjacent modules may rotate, so that with a plurality of such modules interconnected with one another, the overall configuration of serially connected modules may follow substantially any desired path. If desired, a module may be configured of a single L-shaped tube or cylinder at the bend of the L of which there is interiorly disposed an aligned mirror, either flat or curved, e.g. substantially elliptically configured for focussing purposes. The tubular construction may be conductive or nonconductive, its prime purpose being to provide support, rigidity and strength, as well as impermeability to external environmental conditions. Each open end of the tubular subsection of a module is of preferably circular cross-section with a rotationally mounted fitting for coupling to one of the legs of another L-shaped module subsection.

31 Claims, 12 Drawing Figures

MODULAR BEAM WAVEGUIDE

FIELD OF THE INVENTION

The present invention relates to the guided transmission of electromagnetic waves, particularly extremely high frequency electromagnetic waves, through a beam waveguide directive transmission medium.

BACKGROUND OF THE INVENTION

In order to reduce the transmission line loss in an extremely high frequency spectrum microwave transmission system, beam waveguide structures, namely schemes employing mirrors for reflecting RF microwave energy from one point to another, have been proposed. Since the mirrors direct or guide the microwave frequency along a prescribed path, the transmission arrangement may be referred to as a waveguide. Because the microwave energy is guided by the use of mirrors, rather than conducting walls, as is employed in typical microwave transmission schemes, the loss of energy over the transmission path can be significantly reduced as compared with conventional waveguide. This is especially true in the EHF spectrum where the size of the mirrors employed may be made small enough for a beam waveguide system to be a practical alternative to conventional and overmoded waveguide. For example, a system designed for use at 30 GHz over a path length of 80 feet has been calculated to have a loss of only 1 dB while the same system using conventional waveguide has been measured to suffer a loss of at least 12 dB.

On the other hand, previously proposed beam waveguide configurations have been found to be unattractive because of the size of the components required (something which is less of a problem at EHF), alignment of the mirrors, its lack of versatility, and the fact that each site or mirror mounting station requires its own particular design. As a result, beam waveguide has not yet lent itself for use in mobile systems requiring rapid installation time and flexibility in site layout.

SUMMARY OF THE INVENTION

In accordance with the present invention, the beam waveguide approach for transmitting microwave energy has been modularized, each module containing a pair of reflecting surfaces, e.g. mirrors with the mirrors prealigned with one another and mounted in a supporting conduit or tube. Each tube or conduit module has a pair of orthogonal axes about which its joints with adjacent modules may rotate, so that with a plurality of such modules interconnected with one another, the overall configuration of serially connected modules may follow substantially any desired path. If desired, a module may be configured of a single L-shaped tube or cylinder at the bend of the L of which there is interiorly disposed an aligned mirror, either flat or curved, e.g. substantially elliptically configured for focussing purposes. The tubular construction may be conductive or nonconductive, its prime purpose being to provide support, rigidity and strength, as well as impermeability to external environmental conditions. Each open end of the tubular subsection of a module is of preferably circular cross-section with a rotationally mounted fitting for coupling to one of the legs of another L-shaped module subsection. Such single L-shaped module subsections may be serially connected with one another following any desired path as necessary for interconnecting microwave transmitor/receiver apparatus. The only requirement is that the modules be interconnected such that there are alternate groups or sets of curved (focussing) and flat mirrors for maintaining the proper optical focussing of the microwave energy along the transmission path through the modules.

With such a structure, a significant number of advantages over the prior art are obtained. Since each module is of standard configuration, the cost of an overall interconnection system is considerably reduced compared to specifically tailored conventional beam waveguide. Installation is facilitated since the mirrors are prealigned when installed in each individual module, so that on site alignment is unnecessary. Moreover, because of the two axes of rotation capability of each module, path layout is facilitated.

DETAILED DESCRIPTION

Figure 1:
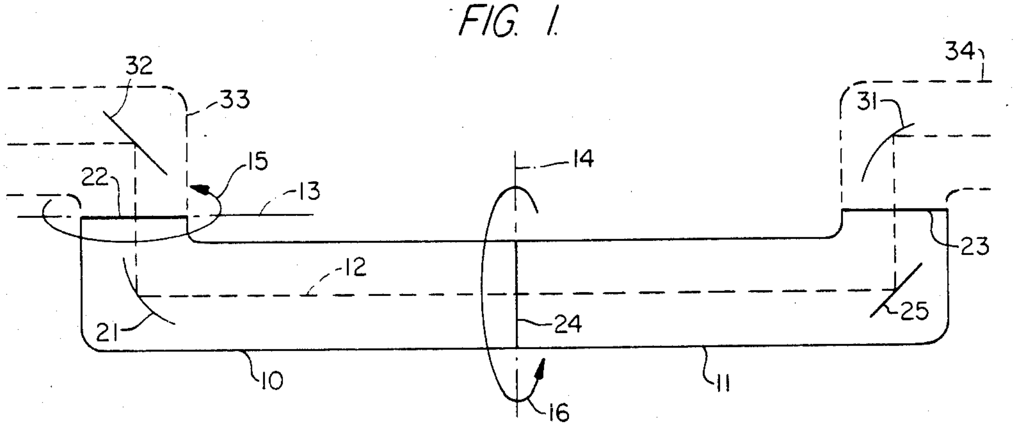
FIG. 1 is a schematic illustration of the internal outline of an individual beam waveguide module containing a pair of L-shaped subsections containing respective elliptical and straight mirror reflectors.

Referring now to FIG. 1, a side view outline of the internal configuration of an embodiment of the modular beam waveguide according to the present invention is illustrated. Each module may consist of a pair of L-shaped subsections 10 and 11, the circular cross-sections of which are orthogonal to a beam transmission axis 12, with the flat circular end faces of sections 10 and 11 abutting one another at joint 24 and being rotatable in a plane 14 in which the joint 24 is located, as shown by arrow 16. For the modular arrangement shown in FIG. 1, an external coupling assembly (e.g. a threaded coupling sleeve not shown) holds circular end faces of subsections 10 and 11 together but does not permit them to be axially separated. To form the overall waveguide, a plurality of such modules may be interconnected together, such that adjacent modules 33 and 34, shown in broken line form and the internal mirrors 32 and 31 of which are illustrated in FIG. 1, may adjoin subsections 10 and 11, respectively, of the module shown in bold lines at joints 22 and 23, as by way of threadingly engaged external sleeves rotatable about such joints, such as shown by the arrow 15 for joint 22 between module 33 and subsection 10.

Subsection 10 contains an internally supported elliptically-shaped mirror 21 properly aligned on axis 12, whereas subsection 11 contains an aligned internally supported flat mirror 25. These mirrors are accurately mounted and aligned within the module during assembly, so that when taken into the field respective sets of modules may simply be serially interconnected with at their rotatable coupling joints, thereby guaranteeing that the microwave beam will travel along the intended transmission axis 12 among any group of modules that are so joined. It is to be observed that in the configuration shown in FIG. 1 each module has a pair of differently shaped internal mirrors 21 and 25, mirror 21 being elliptical and mirror 25 being flat, as noted previously. When the modules are assembled in serial fashion, they are joined such that mirrors of different shape, namely a respective flat and a respective elliptical curved mirror, face one another at the joint in order to provide the necessary focussing of the microwave beam along axis 12, to prevent substantial divergence of the beam so that the entirety of the beam is intercepted by each respective mirror, thereby preventing losses among the successive modules as the beam travels through the modular beam waveguide.

Figure 2:
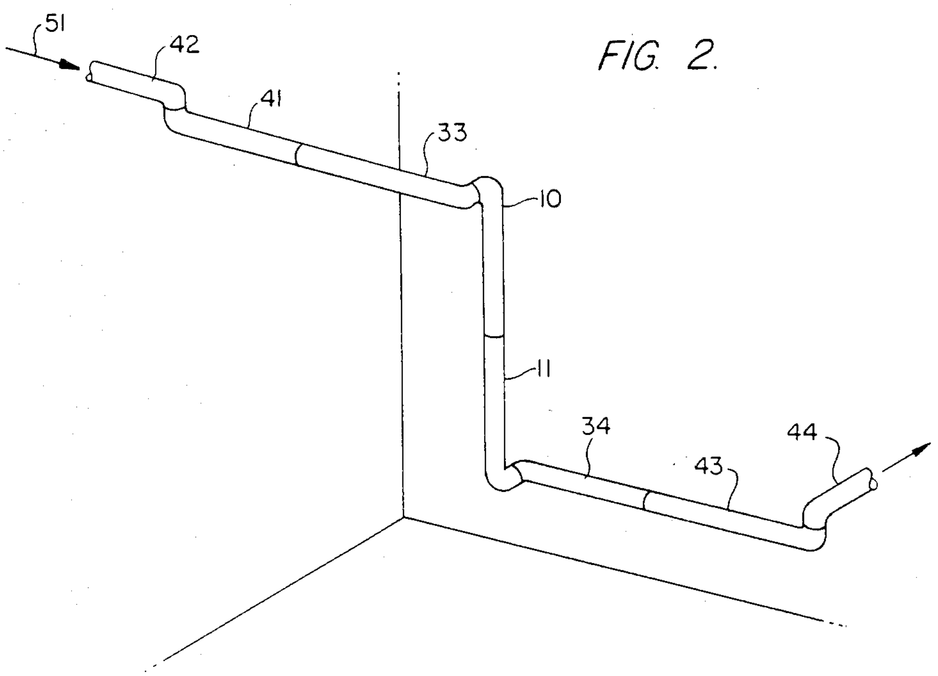
FIG. 2 shows the interconnection of a plurality of beam waveguide modules for transmitting microwave energy over a tortuous path.

FIG. 2 is a pictorial illustration of a plurality of beam waveguide modules as described above with reference to FIG. 1 interconnected with one another along a meandering or tortuous path to provide a serpentine transmission medium for a beam (as shown by arrow 51). Successive modules, subsections 42, 41, 33, 10, 11, 34, 43 and 44 of which are shown, have their respective short legged L-shaped portions joined with one another and appropriately rotated about their respective joints, as necessary, to produce the described configuration.

Figure 3:
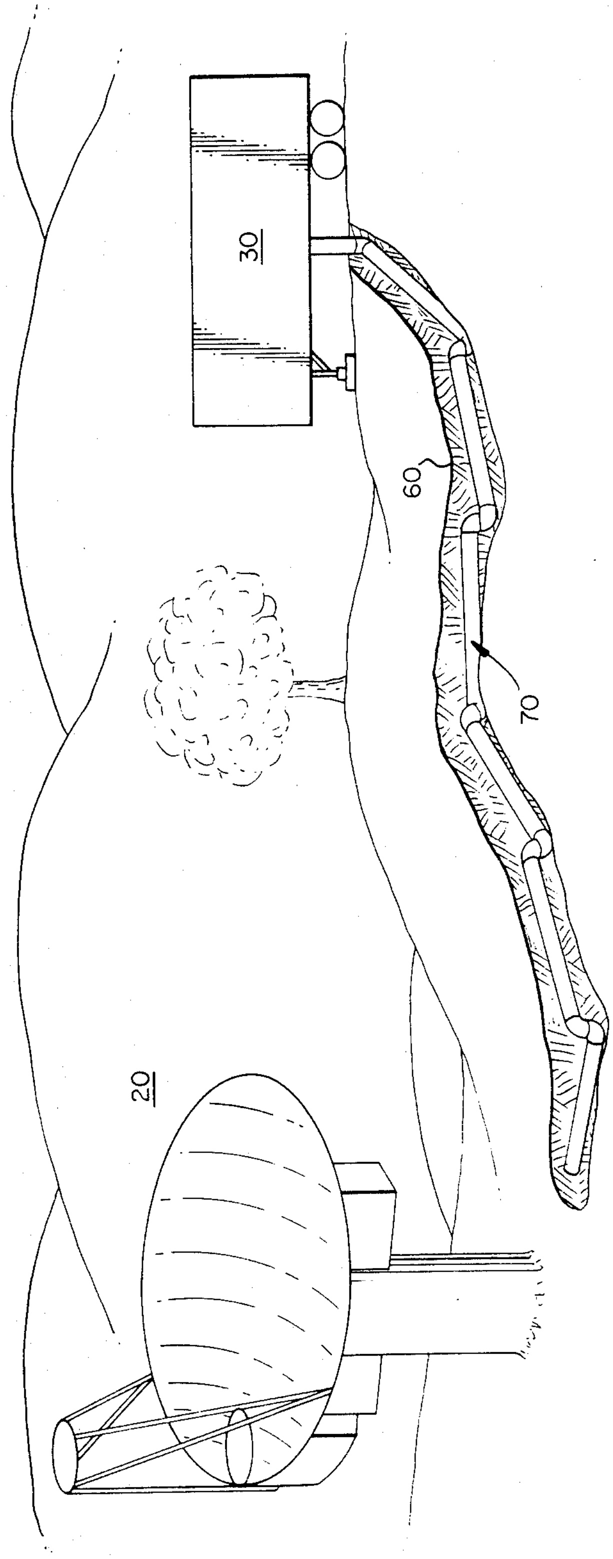
FIG. 3 shows an exemplary application of modular beam waveguide to an on site microwave transmission facility.

FIG. 3 illustrates the manner in which the modular beam waveguide of the present invention may be provided in the form of a landline, here shown as a serpentine-configured structure 70 in a subsurface 60 of terrain on which a transmission facility 30 and an antenna 20 are situated, but which are geographically separated from one another. As noted above, the material of which each section of module beam waveguide is formed is not limited and may, be either conductive or nonconductive. In an environment such as shown in FIG. 3, it is preferably formed of a substantially inert material that is not subject to corrosion by the elements. For this purpose, a material such as polyvinyl chloride (PVC) has been found to be particularly useful.

Figure 4:
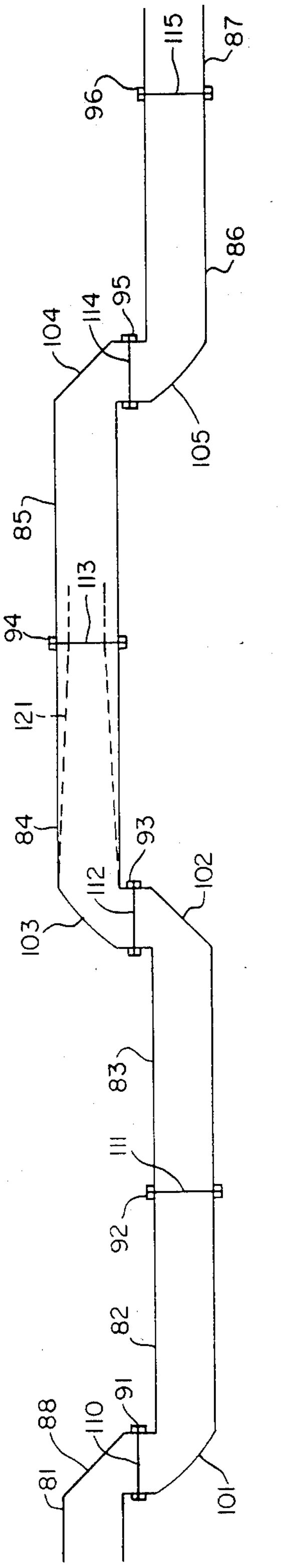
FIG. 4 shows a modification of the beam waveguide structure of FIG. 1 wherein each beam waveguide section has respective elliptically and flat-shaped L-bends.

FIG. 4 illustrates an alternative embodiment of the present invention in which tubular-shaped conduit is modified at the L-shaped bends to form curved (e.g. elliptical) or flat reflecting surfaces for directing the microwave beam internally through the conduit in substantially the same fashion as the configuration shown in FIG. 1. In FIG. 4, modular subsection 82 has an elliptical reflective elbow portion 101, whereas module subsection 83 contains a reflective flat surface elbow portion 102. Subsections 82 and 83 abut against one another at joint 111 with rotatable sleeve 92 providing coupling of subsections 82 and 83 together but permitting their relative rotation about the axis of the beam travelling through this particular module. Similarly, subsection 81, only a portion of which is shown in FIG. 4, abuts against the short leg of modular subsection 82 at joint 110 with rotatable coupling sleeve 91 permitting relative rotation of subsection 81 in the plane of joint 110 relative to subsection 82 to which subsection 81 is joined. It is to be observed that the flat reflecting elbow face 88 of subsection 81 faces the elliptical-shaped reflective elbow surface 101 of subsection 82 to ensure proper focussing of the beam.

Similarly, further modular subsections 84, 85, 86 and 87 are sequentially connected to module subsection 83 with alternating elliptical and flat surfaces 103, 104, 105 providing the necessary focussing of the beam as it traverses the individual modules. At the respective joints 112, 113, 114 and 115 the modules are rotatable around the central axis of the beam waveguide with rotatable coupling sleeves 93, 94, 95 and 96 provided for this purpose. In this manner, as in the configuration shown in FIG. 1 described above, each respective module subsection may be rotated in the plane of its joint with an adjacent module subsection to provide any necessary configuration of the overall waveguide structure as required, such as providing a meandering path shown in FIGS. 2 and 3.

Figure 5:
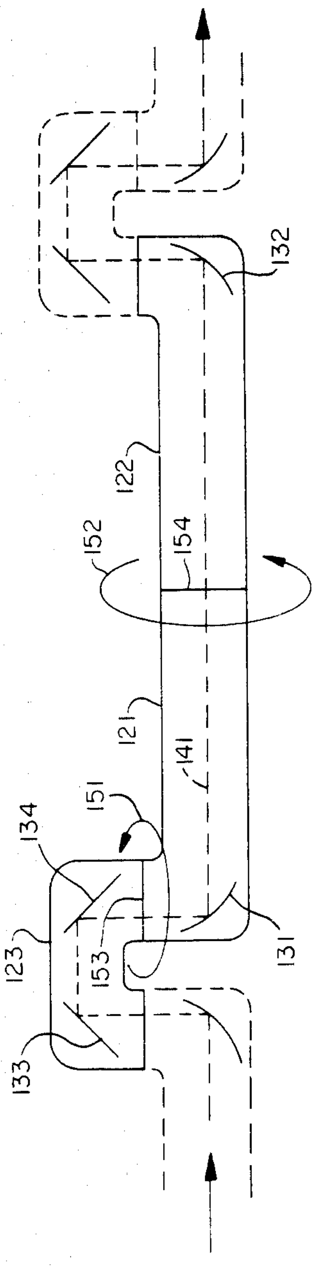
FIG. 5 shows another embodiment of the modular beam waveguide wherein sets of module subsections contain the same types of internal reflectors, with the modules being connected in an alternating fashion.

FIG. 5 shows a further embodiment of the present invention in which an individual module contains two subsections each of which has the same type of internal reflective mirrors, but successive adjacent modules have different path lengths and different mirror shapes. More specifically, module subsections 121 and 122 are rotatably joined together at abutting surfaces 154, with rotation in the plane of joint 154 being illustrated by arrow 152. Each of module subsections 121 and 122 contains an axially-aligned curved (e.g. elliptical) mirror 131, 132, respectively. The length of the longer arm of the L-shaped subsections 121 and 122 is such as to provide a substantial separation between elliptical reflectors 131 and 132. In order to provide the proper focussing of the beam, the module that is connected with either of these subsections, for example module 123 shown in bold line outline in FIG. 5, has a relatively short path length and contains a pair of flat mirrors 133 and 134. At joint 153 module 123 is rotatable about the transmission axis 141 as shown by arrow 151. Here the distance between flat mirrors 133 and 134 is substantially reduced as compared with the distance between mirrors 131 and 132 of module subsections 121 and 122, respectively. The elliptical mirrors act to prevent spreading of the beam outside downstream reflective surfaces upon which the beam is intended to impinge, thereby preventing loss resulting from beam divergence. For this same reason, the distance between flat mirrors must be substantially reduced as compared with the separation of focussing nonflat mirrors, such as those having elliptical or other suitable focussing surfaces, such as a pair a parabolic reflectors, which have been found to be acceptable substitutes for the elliptical-shaped mirrors with consideration given to mirror diameter and separation.

A property of the electromagnetic energy (RF microwave) beam that must be accounted for in the transmission medium is its cross polarization properties, namely the bleeding of one polarity into another orthogonal signal, which is the most difficult constraint in a beam waveguide system.

Figure 6:
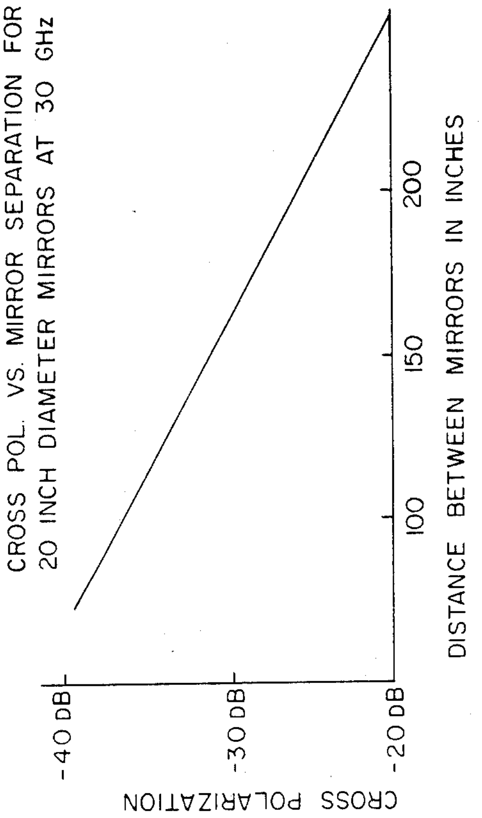
FIG. 6 is a graph showing the relationship between beam cross polarization and reflector separation in a beam waveguide system.

FIG. 6 illustrates the relationship between the cross polarization of the beam and the separation between mirrors in inches, using 20 inch diameter mirrors for a beam at a frequency of 30 GHz. As shown in FIG. 6, the cross polarization of the beam is inversely proportional to the separation or focal length of the mirrors. Thus, when configuring a system according to the present invention as described above, design of the size of the mirrors and separation therebetween within the waveguide will depend upon the microwave frequency of interest.

Figure 7:
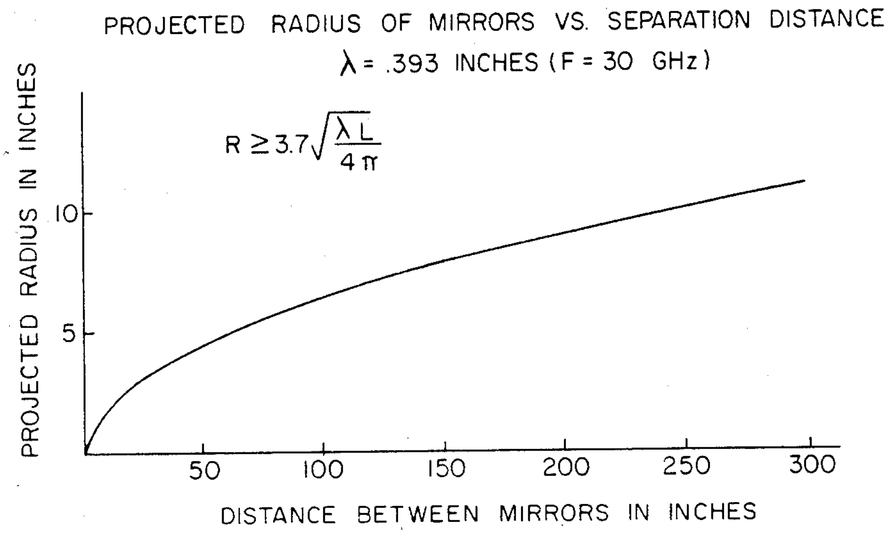
FIG. 7 illustrates the relationship between mirror radius and mirror separation for a beam waveguide structure.

Another design criteria is the diffraction loss relating the distance or separation between the mirrors to the size of the mirrors. FIG. 7 illustrates the relationship between the radius of the mirrors and the separation between the mirrors in inches, again for a frequency of 30 GHz. Using the relationship shown in FIG. 7, for a given length or separation between mirrors, a minimum projected radius of the mirror can be determined. For a 20 inch projected diameter (10 inch radius), the distance between mirrors can be no greater than 235 inches or approximately 19.5 feet.

Figure 8:
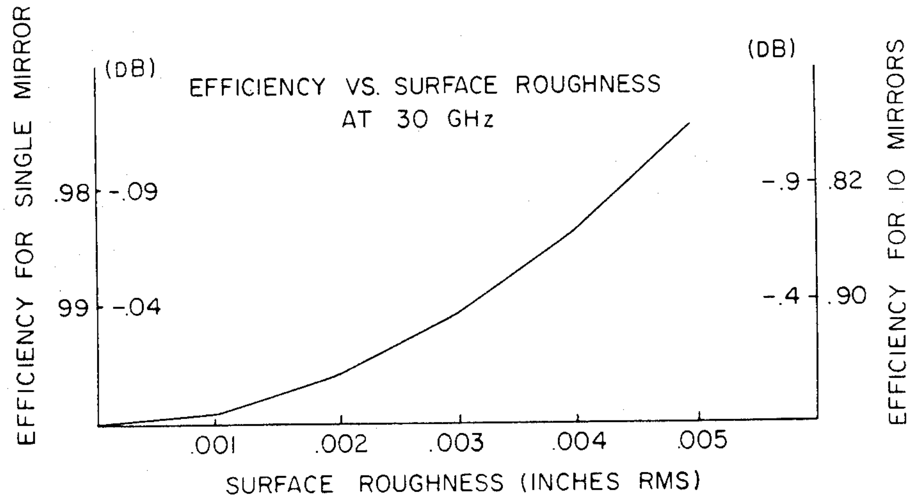
FIG. 8 is a graph showing the relationship between efficiency and surface roughness for a single module and a plurality of serially coupled beam waveguide modules.

A further aspect of the choice of shape, size and material of the mirror and support structure is the surface roughness of the mirror used. Surface roughness causes scattering and loss of the RF energy as it is reflected from one mirror to another. FIG. 8 illustrates the relationship between the efficiency and surface roughness, both for a single mirror and for a plurality, specifically 10, mirrors coupled in cascade. Through the use of layered honeycomb mirrors, fabricated to a surface roughness of 0.003 RMS or less, the efficiency of the mirror system is substantially enhanced, as shown. Electroformed mirrors are capable of providing a surface finish of 0.001 RMS and either electroforming or layered honeycomb structuring is capable of providing a mirror loss compatible at the 20 to 30 GHz range.

In the course of aligning the mirrors within the individual module subsections, of prime importance for the individual mirrors, assuming that consideration has been given to mirror size, separation and roughness, as discussed above, is the displacement of each mirror relative to the intended beam axis and the tilt or inclination of the mirror relative to that axis.

Figure 9:
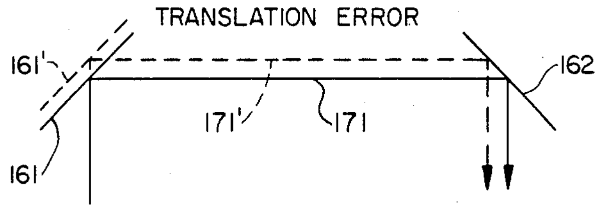
FIG. 9 shows the placement of mirrors for illustrating translation misalignment.

FIG. 9 illustrates how alignment error can be caused by a translation of one mirror relative to another. Shown in bold lines are a pair of flat mirrors 161 and 162 with a beam axis 171 reflecting off of each mirror successively, as shown. For a translation error of mirror 161 to a position 161', as shown, the beam axis is translated in a direction orthogonal to axis 171 to a new axis 171', as shown.

Figure 10:
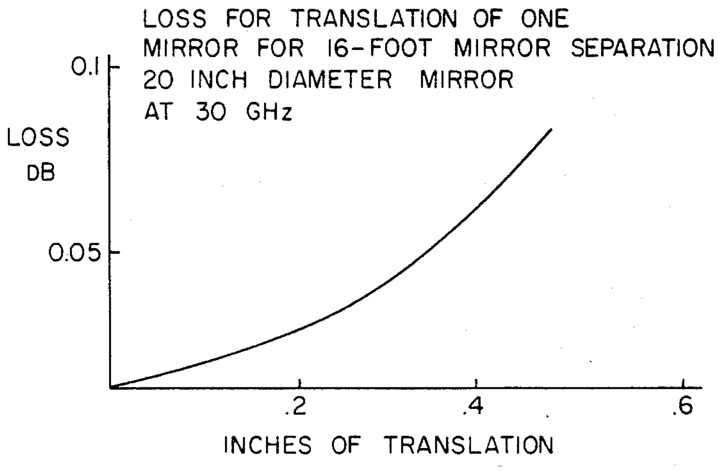
FIG. 10 is a graph showing transmission loss for a single beam waveguide module.

FIG. 10 illustrated the loss for the translation of one mirror for a modular beam construction having a 16 foot mirror separation with a 20 inch mirror diameter at a frequency of 30 GHz. As shown in FIG. 10, the loss is nonlinear and increases fairly rapidly beyond only a small fraction of an inch.

Figure 11:
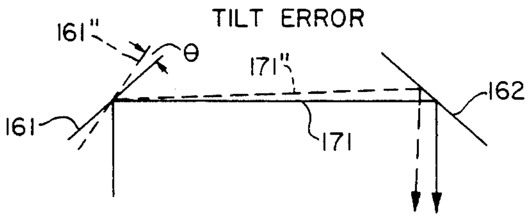
FIG. 11 shows the placement of mirrors for illustrating tilt or inclination misalignment.

FIG. 11 illustrates how alignment error is created by rotation or tilt of one mirror relative to its intended position. Again, the bold lines show mirrors 161 and 162 with intended beam axis 171 intersecting each mirror. Assuming that mirror 161 is tilted or inclined by an angle $\theta$ relative to the intended axis 171 to a new position 161'', the beam now traverses a path 171'', and the separation from intended axis 171 increases in the direction of travel of the beam as the beam reflects off mirror 161'' and downstream mirror 162, as shown.

Figure 12:
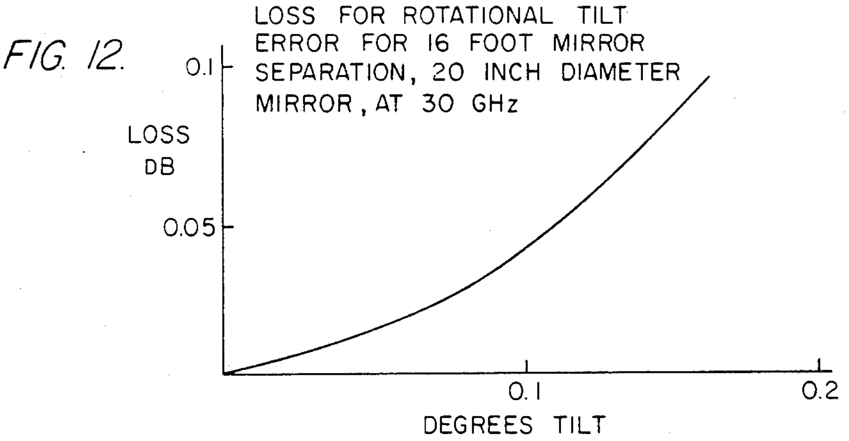
FIG. 12 is a graph showing alignment error vs. mirror title or inclination.

FIG. 12 illustrates the relationship between the loss and tilt or inclination of a mirror for a 16 foot mirror separation, again using a 20 inch diameter mirror at the above-referenced frequency of 30 GHz. As is the case with the loss characteristics shown in FIG. 10, the loss due to inclination or tilt increases rapidly for only a small inclination or offset.

Because of the above factors, the use of beam waveguide structures to date has been extremely limited, since each site, the structure of which is normally different from that of an adjacent site, requires extremely complex alignment procedures so that the total time for aligning successive sites and the complexity of the structure for achieving alignment becomes cost and configuration-prohibitive. Using the modular approach according to the present invention, however, since each module is identically configured, and alignment is established at the time of manufacture of the module, cost of production of the respective components and especially interconnection in the field is considerably simplified. This means that the module approach according to the present invention is a particularly attractive solution for waveguide structures, especially at EHF. Losses that otherwise occur in normal waveguide structures, wherein the walls of the waveguide are conductive, is not a problem with the present invention, as the support structures do not in and of themselves establish a current conveying path but, preferably, are nonconductive and thereby substantially impervious to environmental intrusion into the beam transmission path.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use in the transmission of microwave energy a waveguide structure comprising:

a reflective surface upon which microwave energy travelling in a first direction and to be conveyed via said waveguide structure may impinge so as to be reflected in a second direction; and a support structure within which said reflective surface is positioned, said support structure having first and second portions extending in said first and second directions respectively and through which microwave energy may be conveyed and reflected from said reflective surface; and wherein at least one of said first and second portions of said support structure is configured to be joined with one of the first and second portions of an adjacent support structure to be coupled thereto; and wherein the medium of propagation of said microwave energy is exclusive of the material of which said support structure is made.

2. A waveguide structure according to claim 1, wherein at least one of said first and second portions of said support structure is configured to be rotatably joined with one of the first and second portions of an adjacent support structure to be coupled thereto.

3. A waveguide structure according to claim 2, wherein each of said first and second portions of said support structure is configured to be rotatably joined with a respective one of the first and second portions of an adjacent support structure to be coupled thereto.

4. A waveguide structure according to claim 1, wherein said reflective surface comprises a substantially flat reflective surface.

5. A waveguide structure according to claim 1, wherein said reflective surface comprises a curved reflected surface providing focussing of microwave energy impinging thereon.

6. A waveguide structure according to claim 5, wherein said reflective surface comprises an elliptically shaped mirror.

7. A waveguide structure according to claim 1, wherein each of said first and second portions of said support structure is configured to be joined with one of the first and second portions of an adjacent support structure to be coupled thereto.

8. A waveguide structure according to claim 1, wherein said reflective surface provides focussing of microwave energy impinging thereon.

9. A waveguide structure according to claim 8, wherein the spectrum of frequencies of said microwave energy includes EHF microwaves.

10. A waveguide structure for use in the transmission of microwave energy comprising:

a first reflective surface upon which microwave energy travelling in a first direction and to be conveyed via said waveguide structure may impinge so as to be reflected in a second direction;

a first support structure within which said first reflective surface is positioned, said first support structure having first and second portions extending in said first and second directions, respectively, and through which microwave energy may be conveyed and reflected from said first reflective surface;

a second reflective surface upon which microwave energy travelling in a third direction and to be conveyed via said waveguide structure may impinge so as to be reflected to a fourth direction; and a second support structure within which said second reflective surface is positioned, said second support structure having first and second portions extending in said third and fourth directions, respectively, and through which microwave energy may be conveyed and reflected from said second reflective surface; and wherein one of the first and second portions of said first support structure is joined with one of the first and second portions of said second support structure whereby a corresponding one of said first and second directions is coincident with a corresponding one of said third and fourth directions, respectively; and wherein the medium of propagation of said microwave energy is exclusive of the material of which said first and second support structures is made.

11. A waveguide structure according to claim 10, wherein said one of the first and second portions of said first support structure is rotatably joined with said one of the first and second portions of said second support structure about an axis extending in a direction coincident with the corresponding ones of said first and second and said third and fourth directions.

12. A waveguide structure according to claim 10, wherein said first and second reflective surfaces have substantially the same shape.

13. A waveguide structure according to claim 12, wherein each of said first and second reflective surfaces comprises a microwave energy focussing substantially flat reflective surface.

14. A waveguide structure according to claim 12, wherein each of said first and second reflective surfaces comprises a curved reflective surface.

15. A waveguide structure according to claim 12, wherein each of said first and second reflective surfaces comprises an elliptically-shaped mirror.

16. A waveguide structure according to claim 10, wherein said first and second reflective surfaces have respectively different shapes.

17. A waveguide structure according to claim 16, wherein said first reflective surface comprises a substantially flat reflective surface and said second reflective surface comprises a microwave energy focussing curved reflective surface.

18. A waveguide structure according to claim 17, wherein said curved reflective surface comprises an elliptically-shaped mirror.

19. A waveguide structure according to claim 16, wherein said one of the first and second portions of said first support structure is rotatably joined with said one of the first and second portions of said second support structure about an axis extending in a direction coincident with the corresponding ones of said first and second and said third and fourth directions.

20. A waveguide structure according to claim 10, wherein each of said first and second portions of said first and second support structures is configured to be joined with one of the first and second portions of respective adjacent third and fourth support structures to be coupled thereto.

21. A waveguide structure according to claim 20, wherein each of the first and second portions of said first and second support structures is configured to be rotatably joined with one of the first and second portions of respective adjacent third and fourth support structures to be coupled thereto about respective axes coincident with corresponding others of said first and second directions and said third and fourth directions, respectively.

22. A waveguide structure according to claim 10, wherein one of said reflective surfaces provides focussing of microwave energy impinging thereon.

23. A waveguide structure according to claim 22, wherein the spectrum of frequencies of said microwave energy includes EHF microwave.

24. A waveguide structure for use in the transmission of microwave energy comprising a plurality of waveguide modules serially joined with one another, each module comprising:

a reflective surface upon which microwave energy travelling in a first direction and to be conveyed via said module may impringe so as to be reflected in a second direction; and a support structure within which said reflective surface is positioned, said support structure having first and second portions extending in said first and second directions respectively through which microwave energy may be conveyed and reflected from said reflective surface; and wherein each of said first and second portions of said support structure is configured to be joined with one of said first and second portions of the support structure of an adjacent module to be coupled thereto; and wherein the medium of propagation of said microwave energy is exclusive of the material of which said support structure is made.

25. A waveguide structure according to claim 24, wherein at least one of said first and second portions of the support structure of a respective module is configured to be rotatably joined with one of the first and second portions of the support structure of an adjacent module to be coupled thereto.

26. A waveguide structure according to claim 24, wherein each of said first and second portions of the support structure of a respective module is configured to be rotatably joined with a respective one of the first and second portions of the support structure of an adjacent module to be coupled there.

27. A waveguide structure according to claim 26, wherein, reflective surfaces of selected adjacent modules are of the same shape.

28. A waveguide structure according to claim 26, wherein reflective surfaces of selected adjacent modules are differently shaped.

29. A waveguide structure according to claim 26, wherein reflective surfaces of selected modules include flat surfaced reflections and curved surface reflectors.

30. A waveguide structure according to claim 24, wherein said reflective surface provides focussing of microwave energy impinging thereon.

31. A waveguide structure according to claim 30, wherein the spectrum of frequencies of said microwave energy includes EHF microwaves.

* * * * *